United States Patent [19]

Fuldner

[11] 4,451,828
[45] May 29, 1984

[54] LINEARITY ADJUSTMENT OF SPACECRAFT TUBULAR SPAR-TYPE MEMBERS

[75] Inventor: William V. Fuldner, Yardley, Pa.

[73] Assignee: RCA Corporation, New York, N.Y.

[21] Appl. No.: 294,738

[22] Filed: Aug. 20, 1981

[51] Int. Cl.³ .......................... H01Q 1/28; H01Q 1/08
[52] U.S. Cl. ................. 343/872; 343/DIG. 2; 52/110; 244/173
[58] Field of Search .............. 343/872, DIG. 2; 244/173, 219; 52/108, 110

[56] References Cited

U.S. PATENT DOCUMENTS 3,331,075 7/1967 Moulton .......................... 343/877
3,524,190 8/1970 Killion et al. ...................... 343/877
3,930,626 1/1976 Croswell ............................ 244/219

Primary Examiner—Eli Lieberman
Attorney, Agent, or Firm—Joseph S. Tripoli; Robert L. Troike; Christopher Lyle Maginniss

[57] ABSTRACT

Heating elements and temperature sensing devices are positioned in diametrically opposed pairs along a tubular boom extending outwardly from a spacecraft. As temperature differentials are detected across the diameter of the boom, current is selectively applied to the heating element on the cooler side of the boom to equalize the temperature and prevent boom distortion. In another application, current may be selectively applied to a heating element to cause bending of the boom to achieve a desired positioning of the tip portion of the boom.

18 Claims, 23 Drawing Figures

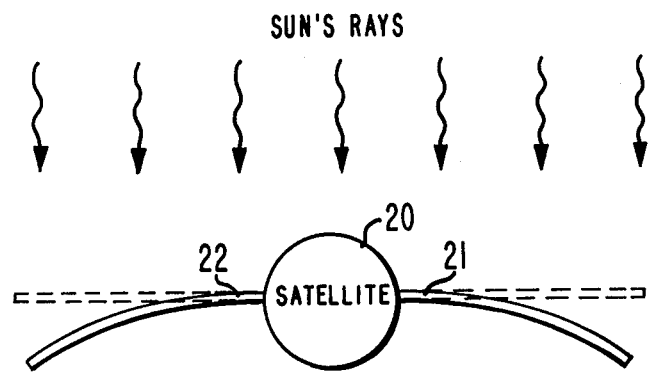
Fig. 1
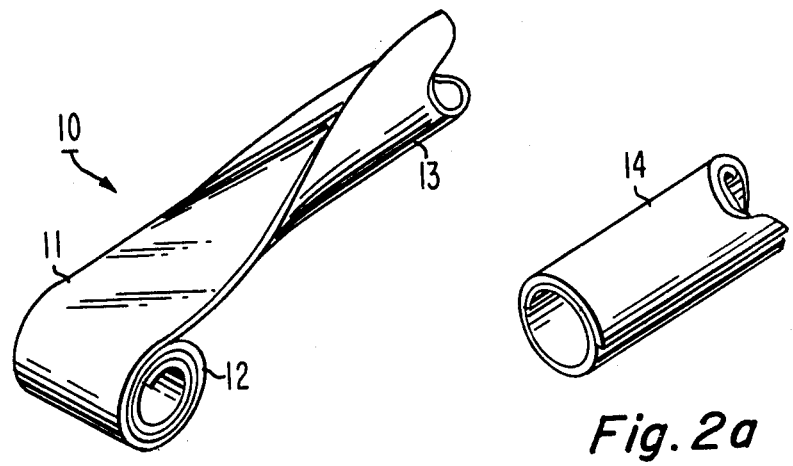
Fig. 2
Fig. 2a
PRIOR ART
Fig. 2
PRIOR ART
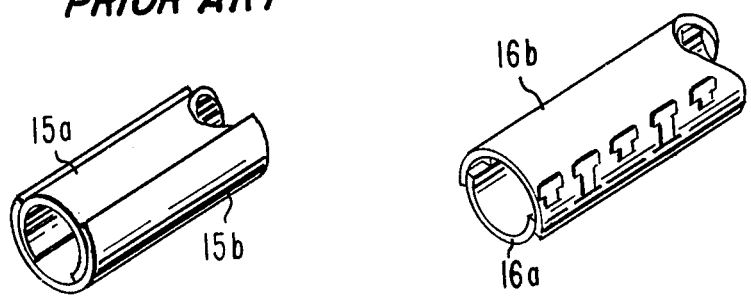
Fig. 2b
PRIOR ART
Fig. 2c
PRIOR ART

LINEARITY ADJUSTMENT OF SPACECRAFT TUBULAR SPAR-TYPE MEMBERS

This invention relates to an apparatus which controls the linearity of a spar-type member extending outwardly from a spacecraft due to unequal heat loading as from the sun.

Spar-type members such as booms have been utilized in space missions to provide many functions: they are used to support remotely positioned telemetry equipment; they function as antenna elements in scientific experiments for sensing the presence of radio waves; and they are used as antennas for RF communications with earth stations and other spacecraft. Each of these functions is limited in its achievable performance by the degree of linearity which can be attained for the erected spar-type member, especially in view of the influence of thermal gradients.

Satellite booms are commonly of the type which are stowed during the time the satellite is being powered into orbit, and are deployed while orbiting. Typical of this class of booms is a thin metallic ribbon which, because of transverse stresses built into it, assumes a tubular shape of high strength when extended. For storage it is flattened and coiled into a spool.

There are two basic extendible tubular boom configurations. The single-element type forms a tube with or without an overlap of its longitudinal edge portions. The dual-element type comprises two ribbons which, when extended, form circular sections of up to 360°, one inside the other, such that the respective openings are diametrically opposed. A special configuration of the dual-element type involves a first ribbon having a plurality of tabs forming its longitudinal edges and a second ribbon having a corresponding plurality of slots adjacent its longitudinal edges. The tabs of the first ribbon are engaged with the slots of the second ribbon and, when the boom is deployed, each ribbon assumes a semi-circular shape with a minimum of overlap. When the ribbons are flattened for coiling into a spool, the tabs remain engaged with the slots.

Radiant energy from the sun tends to heat one side of an extended boom to the exclusion of the diametrically opposite side. The temperature gradient is of significance in a space environment where there is no air to provide convection heating of the entire tube. Further, metallic ribbons, such as beryllium copper and stainless steel, are too thin to provide a sufficient conductive path for distribution of the heat energy around the circumference of the tube; this problem is aggravated by the dual-element extendible tubular boom which has the further obstacle of conducting heat between the two ribbons.

Unequal heating of the extended booms, some of which may be 60 feet in length, will cause distortion of those members resulting in inaccurate positioning of instruments or antennas. The inaccuracy due to distortion is doubled in those cases where two booms are extended from the spacecraft in opposite directions so as to have a common axis. It is impractical to provide passive thermal control elements to shield the sun's rays from the booms; hence a form of dynamic thermal compensation must be furnished.

In accordance with the present invention, an apparatus is disclosed by which linearity of a spar-type member extending outwardly from a spacecraft is controlled. The apparatus includes an electrically resistive heating element attached to the member and means for providing an electric current to the heating element, such that the sector of the member adjacent the heating element is heated and expands relative to the unheated sectors of the member.

In the drawing:

FIG. 1 is a sketch illustrating the spacecraft boom distortion problem due to unequal heating from the sun;

FIG. 2 is a sketch of an extendible boom in a partially extended state;

Figure 3:
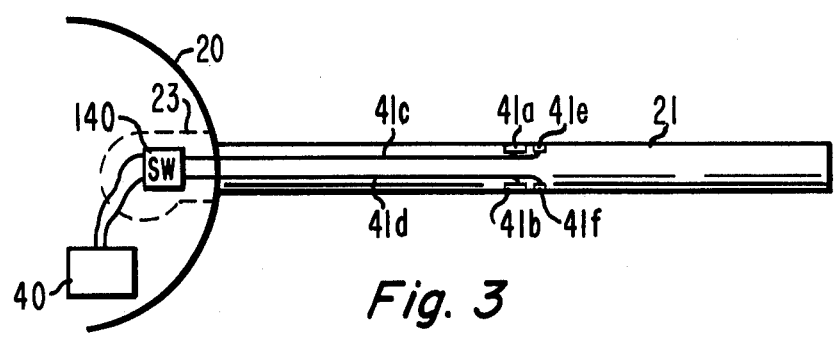
Figure 4:
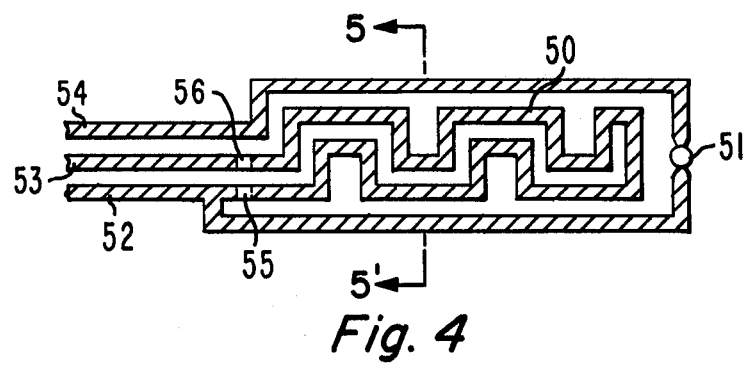
Figure 5:
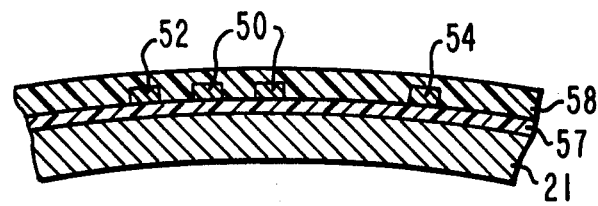
Figure 6:
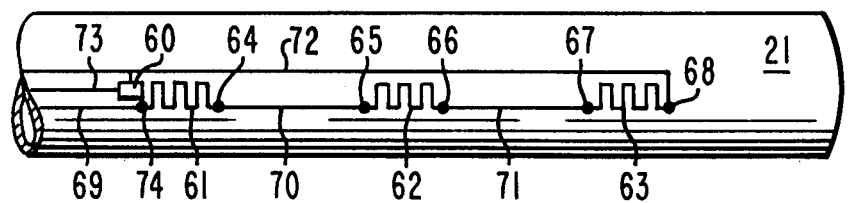
Figure 3A:
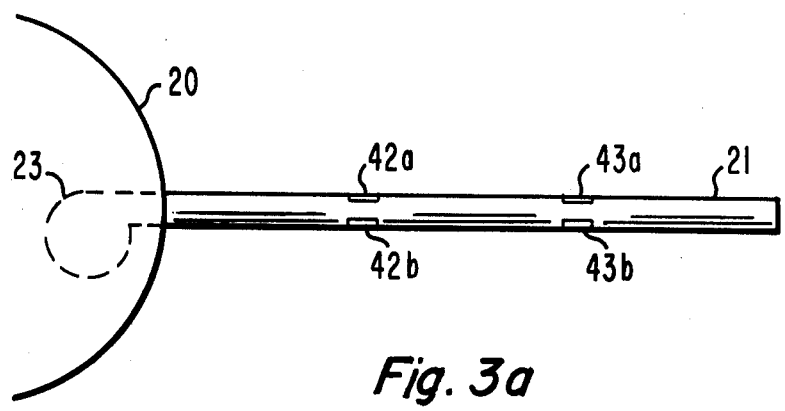
Figure 3B:
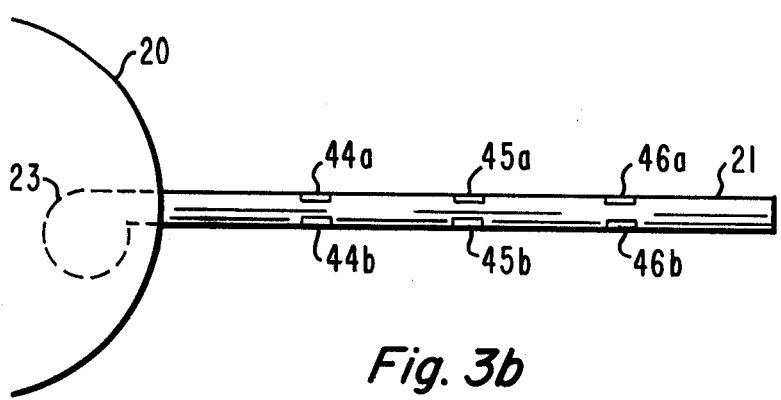
Figure 3C:
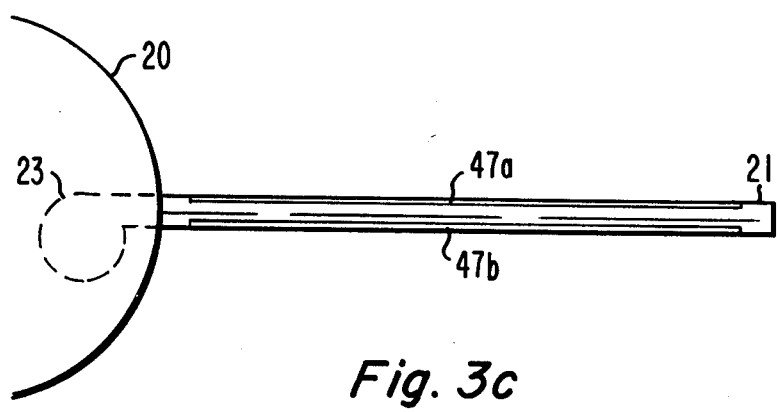
Figure 7:
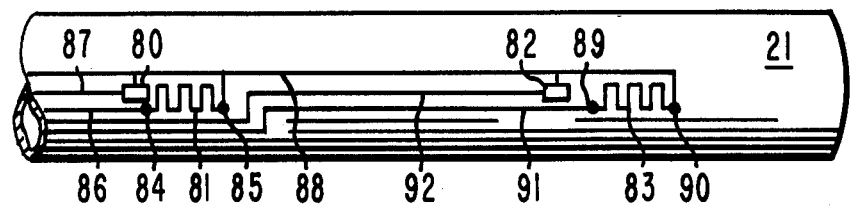
Figure 10:
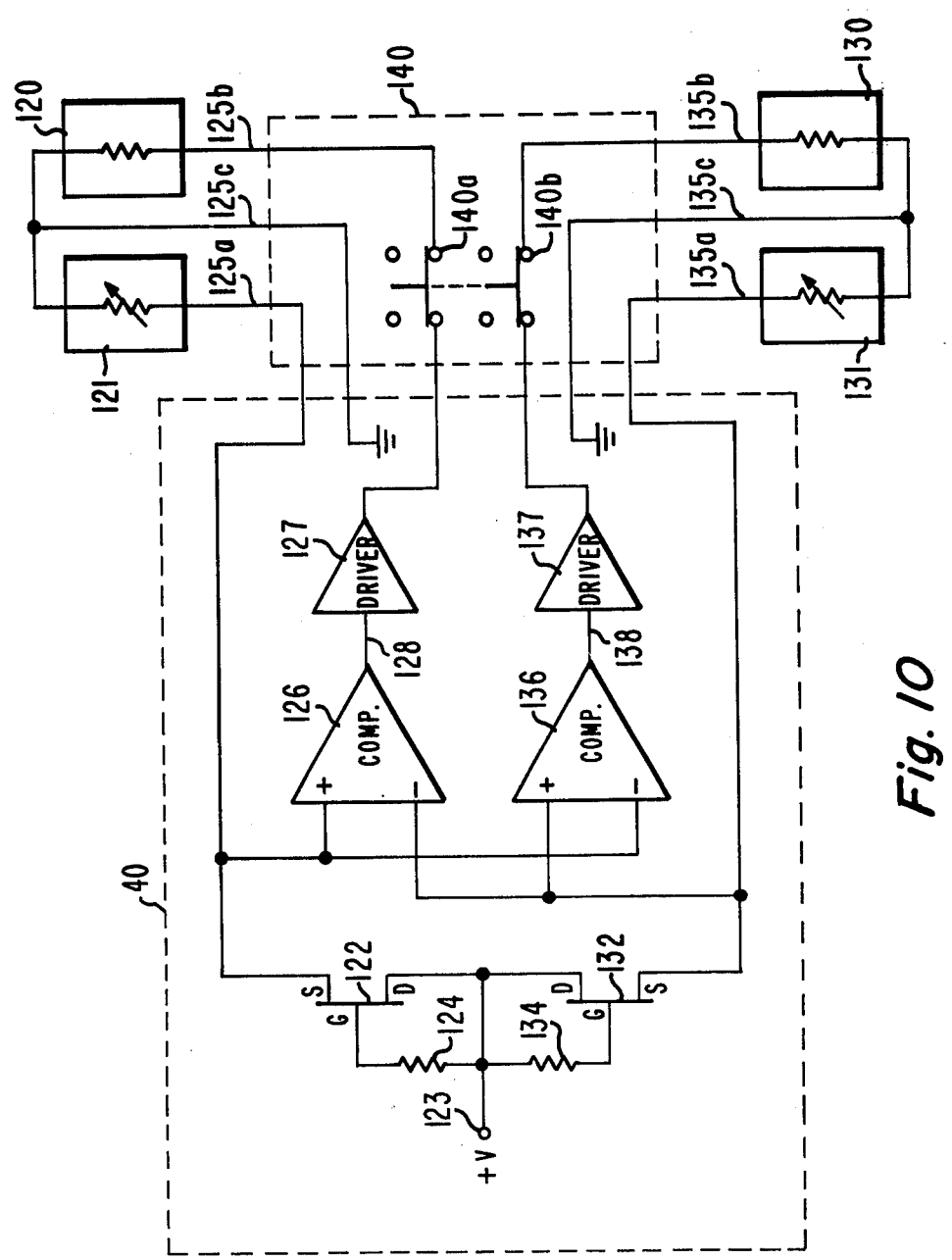
Figure 12:
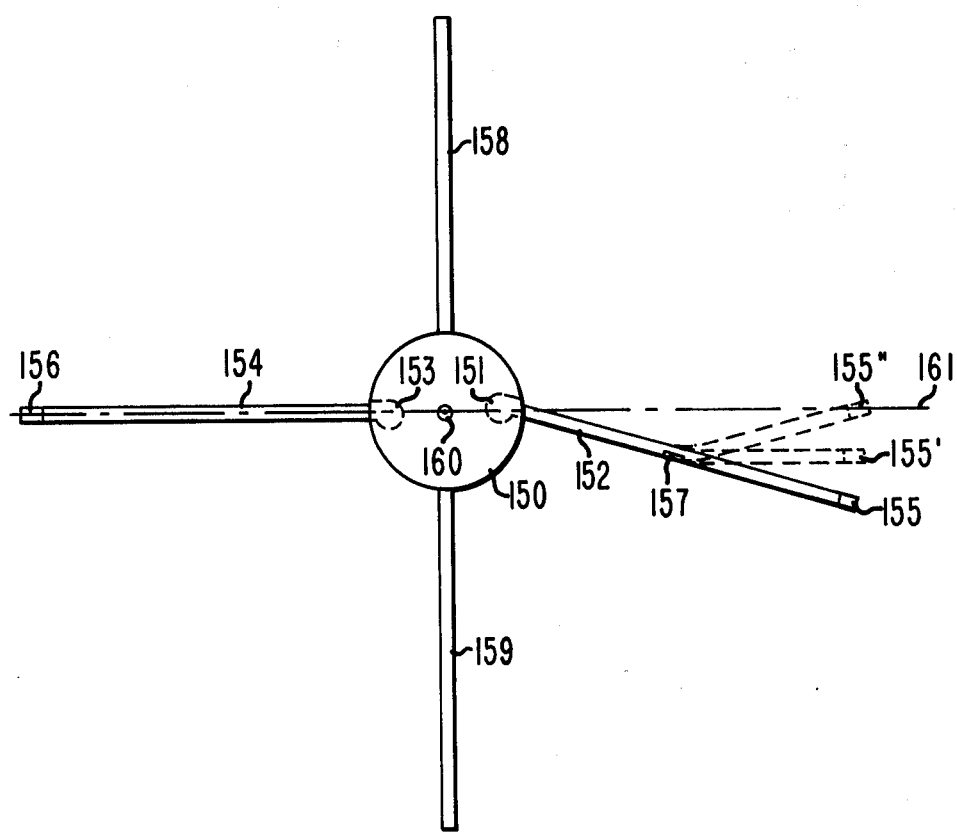
Figure 13:
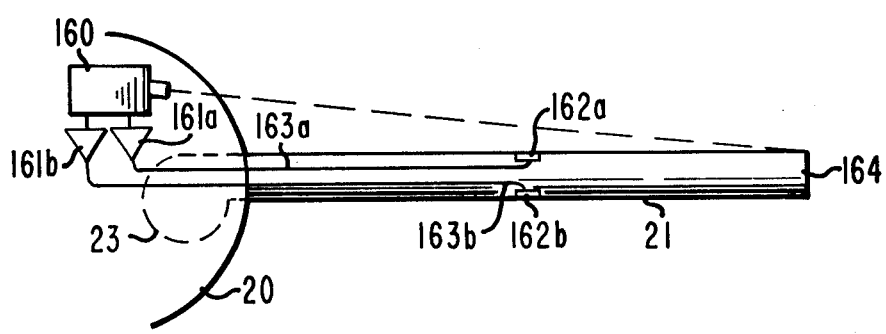

FIGS. 2a, 2b, and 2c are sketches illustrating examples of three types of tubular extendible booms known in the art;

FIG. 3 illustrates a system for adjusting the linearity of a spar-type member according to one embodiment of the present invention using one pair of heating elements;

FIG. 3a is a sketch of an embodiment of the present invention illustrating the preferred locations of the heating elements when the system of FIG. 3 includes two pairs of heating elements on a tubular boom;

FIG. 3b is a sketch of an embodiment of the present invention illustrating the preferred locations of the heating elements when the system of FIG. 3 includes three pairs of heating elements on a tubular boom;

FIG. 3c is a sketch of an embodiment of the present invention illustrating the preferred locations of the heating elements when the system of FIG. 3 includes one pair of distributed heating elements;

FIG. 4 is a plan view of one strip heating element and temperature sensor according to one embodiment of the present invention as used in FIGS. 3, 3a, and 3b;

FIG. 5 is a cross-sectional view of the strip heating element of FIG. 4 through 5-5';

FIG. 6 is a sketch of a portion of a boom having three heating elements controlled by a single temperature sensor according to one embodiment of the present invention;

FIG. 7 is a sketch of a portion of a boom having two independently controlled heating elements according to another embodiment of the present invention;

FIG. 8 is a cross-section of a tubular boom having the placement of a pair of heating elements (a) on the outside surface of the boom, and (b) on the inside surface of the boom;

FIG. 9 is a cross-section of a tubular boom having two pairs of heating elements in quadrature distribution (a) on the outside surface of the boom, and (b) on the inside surface of the boom;

FIG. 10 is the circuit diagram of the controlled current source for the pair of heating elements according to the embodiment of FIG. 3 of the present invention;

FIG. 11 is a cross-section of the boom and the heating elements of the present invention where the extendible tubular boom is of the (a) single-element type, (b) of the dual-element overlapping type, and (c) of the dual-element tab-in-slot type depicting both the extended and flattened cross-sections of the tubular booms;

FIG. 12 is a sketch of the spacecraft and booms to illustrate how the heating elements of the present invention may be used to induce distortion in a tubular boom according to another embodiment of the present invention; and FIG. 13 illustrates a system for adjusting the linearity of a spar-type member according to a further embodiment of the present invention.

FIG. 1 illustrates the nature of the problem which the present invention is designed to remedy. Booms 21 and 22 extending outwardly from satellite 20 are exposed to the rays of the sun on one side but are shielded from it on the other. As a result, a thermal gradient is established across each boom structure; the sides facing the sun experience linear expansion greater than the sides facing away from the sun. The booms are thus distorted as shown in FIG. 1, with the tip portion of the booms bent away from the sun's rays.

The unequal heating problem is of special concern in extendible booms of a type shown in FIG. 2. Boom 30 comprises an elongated ribbon capable of being rolled up flat into a spool and forming, when unrolled, a tube having overlapping longitudinal edge portions. This figure illustrates diagrammatically the transition between the spool 31 and the tube 32.

FIGS. 2a, 2b, and 2c show variations of the means for maintaining rigidity of the extended boom. FIG. 2a illustrates the tip portion of a furlable tubular boom consisting of a single ribbon 14 formed into a circular section such that the longitudinal edges overlap by a considerable arc, in this case approximately 180°. FIG. 2b illustrates the tip portion of a furlable tubular boom consisting of two ribbons 15a and 15b each formed into an open circular section such that each ribbon circumscribes an arc of approximately 270°. Ribbon 15a is placed inside ribbon 15b such that the openings are diametrically opposed. When the ribbons are flattened for retraction, they may be furled into separate spools or into a single spool. FIG. 2c illustrates the tip portion of a two-ribbon boom in which the longitudinal edges of one ribbon 16a are formed into tabs, and the longitudinal edges of the other ribbon 16b have corresponding slots into which the tabs are inserted, such that when the ribbons are unfurled and they assume their circular sections, the tab-in-slot configuration constrains the ribbons, forming a tubular boom of circular cross-section. Unlike the two-ribbon boom of FIG. 2b, the tab-in-slot boom must furl into a single spool.

In all of the figures, as well as in the description thereof, no illustration or reference is made to the structure necessary for the rolling or spooling of the ribbon or ribbons or the supporting and dispensing thereof since it is considered that conventional spools, guiding structures, and other structures presently known in the art will be used.

This disclosure describes an apparatus which improves the achievable linearity of spar-type members such as extended booms by providing dynamic thermal compensation for the temperature gradients encountered by spacecraft. Referring to FIG. 3, in accordance with one embodiment of the present invention, a single pair of electrically resistive heating elements 41a and 41b are placed on a tubular boom 21 that extends from a dispenser 23 located within spacecraft 20. FIG. 3 shows that the single pair of heating elements 41a and 41b are optimally placed in diametric opposition approximately midway along the length of extended boom 21. These electrically conductive heating elements 41a and 41b are electrically coupled to a controlled source 40 of electrical current via, for example, three-conductor cables 41c and 41d. A technique for providing a plurality of electrical conductors on extendible booms is disclosed in the copending application, Ser. No. 294,739, titled "Extendible Tubular Booms for Remote Sensors," of Ronald C. Maehl, filed even date herewith and assigned to the same assignee of the present invention.

Temperature sensing devices 41e and 41f, such as thermistors, are positioned along diametrically opposed sides of the extended boom 21 at spacings appropriate to the degree of dynamic thermal compensation required for the particular application. For example, the sensing devices 41e and 41f may be adjacent the heating elements 41a and 41b. Electrical signals representing the sensed temperatures from the sensing devices 41e and 41f are returned via conductors in cables 41c and 41d, respectively, to the controlled current source 40, which includes signal processing electronics and current drivers, mounted on the main body of the spacecraft 20.

Switch assembly 140 interrupts the current flow between controlled current source 40 and heating elements 41a and 41b when boom 21 is in its stowed position. Switch assembly 140 may be mechanically actuated by the physical positioning of the furled ribbon within dispenser 23, or it may respond to electrical signals generated by satellite control circuits (not shown). The electrical signals representing the sensed temperatures are compared in the signal processing unit 40 and a signal which represents the developed measurement of temperature differential across the diameter of boom 21 controls the electrical current to the appropriate heating element which is a resistive wire segment mounted in proximity with that temperature sensor indicating the lower temperature. A more detailed discussion of the means of attachment of heating elements 41a and 41b and the conductors of cables 41c and 41d to boom 21 is presented in connection with the description of FIG. 5. Closed loop electronic control of the heating element reduces the gradients across tubular boom 21, thereby eliminating the source of the undesirable thermally induced deflection. A more detailed description of a controlled current source according to one embodiment of the present invention is shown in FIG. 10.

In FIG. 3a it is seen that where two pairs of heating elements 42a, 42b and 43a, 43b are employed, the pairs are located at points along the extended boom 21 which divides the boom approximately in thirds. Similarly, three pairs of heating elements 44a, 44b; 45a, 45b; and 46a, 46b are located, as shown in FIG. 3b, at points which divide the extended boom 21 into fourths. FIG. 3c illustrates an embodiment in which a single pair of heating elements 47a and 47b is distributed substantially along the entire length of the extended boom, rather than in discrete segments as shown in FIG. 3, 3a, and 3b.

An example of one configuration of a heating element and temperature sensor is shown in top view in FIG. 4. The heating element 50 may be of the chemically etched foil type, sandwiched within a thin, electrically insulated, heat conducting material, similar to Thermofoil heaters sold by Minco Products, Inc., Minneapolis, Minn. Thermofoil heaters are available with Kapton (a polyimide), Mylar (a polyetheylene), silicon rubber, or epoxy-glass insulation, and may be attached to boom 21 using a pressure-sensitive adhesive. Kapton and Mylar are trademarks of and are sold by E. I. Du Pont deNemours & Co., Inc., Wilmington, Del. One Thermofoil heater capable of dissipating at least 4 watts of power has a longitudinal dimension of 2 inches (5.08 cm.), including connecting pads, a width of 0.6 inches (1.5 cm.), and a maximum thickness of 0.01 inches (0.025 cm.), when Kapton insulation is used.

Alternatively, heating element 50 may be affixed to the boom (with an intervening electrically-insulating layer in the case of a metallic boom) using the technique taught in the cited reference. Heating element 50, as shown in FIG. 4, may be a serpentine foil strip of electrically resistive material such as nichrome which dissipates heat in response to the current passed through it. Element 50 is coupled to the source of current 40 (See FIG. 3) via conductors 52 and 53 which are flexible foil strips of a substance of high electrical conductivity such as gold, silver or copper. The coupling between heating element 50 and conductors 52 and 53 takes place at overlap tabs 55 and 56, respectively, and is accomplished by a technique such as spot welding. Although soldering as a means of connection is feasible, spot welding provides a good electrical contact without the additional thickness of solder at the overlap tabs 55 and 56 which is of concern when the extended tube 21 is furled into a spool.

Thermistor 51, which senses the temperature of boom 21 adjacent to heating element 50, is connected to the signal processing electronics of current source 40 (See FIG. 3) by conductors 52 and 54. Because the neutral (or return) wire of both thermistor 51 and heating element 50 can be tied to a common potential, a single conductor 52 may be used for both. Conductors 52, 53 and 54 are the three-conductor cables 41c or 41d of FIG. 3.

While the heating element and thermistor configuration of FIG. 4 would be appropriate for use in the embodiment shown in FIGS. 3, 3a, and 3b, a less serpentine, or even a straight, strip of heating element resistive wire would be a practical implementation in the embodiment of FIG. 3c.

FIG. 5 is a cross-sectional view through FIG. 4 at 5-5' of heating element 50 and conductors 52 and 54. It shows, in exaggerated scale, a prestressed wall of tubular boom 21 to which is applied a thin insulating layer 57, conductors 52 and 54 and heating element 50 fixed to layer 57, and a top insulating layer 58 fixed to and coating the conducting strips. Insulating layer 57 may comprise, for example, a sheet of a polyimide or a polyethylene compound such as Kapton or Mylar, respectively. Layer 57 may be as thin as 0.5 mils, when using these compounds, because of their extremely low electrical conductivity ($10^{-16}$ S/m) and their relatively high dielectric strengths (7,000–7,500 V/mil). Both Kapton and Mylar are sufficiently flexible to withstand the flexures of the furling and extending of boom 21.

Heating element 50 comprises a relatively thin, e.g., 1 to 5 mils, and narrow, e.g., 0.025 to 0.125 inches, foil strip of electrically resistive material such as nichrome. Conductors 52 and 54 comprise relatively thin, e.g., 1 to 2 mils, and narrow, e.g., 0.125 inches, foil strip of an electrically conductive, ductile metal such as gold, silver or copper. Conductors 52 and 54 must provide a cross-sectional area sufficient to conduct an amount of current required for the heating application. In addition, the foil strips of heating element 50 and conductors 52 and 54 must be sufficiently flexible to as to withstand the stresses associated with furling and unfurling of boom 21.

Insulating layer 58 covers heating elements 50 and conductors 52 and 54 and may be of the same type and thickness as layer 57. Insulating layer 58 prevents electrical shorting across the strips of heating element 50 and conductors 52 and 54 and it may also afford protection to those strips from deleterious contact with other objects, but where that level of protection is deemed unnecessary, insulating layer 58 may not be required.

The adhesive which bonds insulating layer 57 to boom 21, heating elements 50 and conductors 52 and 54 to layer 57, and insulating layer 58 to heating element 50, conductors 52 and 54, and layer 57 may be, for example, type SC-1337 adhesive sold by H. P. Fuller Co., Minneapolis, Minn., a flexible, pressure-sensitive adhesive having a synthetic rubber base, and suited for bonding polyethylene films to metal and metal foil.

The foregoing paragraphs discussed the thickness of insulating layers 57 and 58, heating elements 50 and conductors 52 and 54 in terms of minimum dimensions. However, maximum thickness of these components is also of concern. Boom 21 furls into a compact spool which will be of increased diameter when insulating layers 57 and 58, heating element 50 and conductors 52 and 54 are added. To maintain a reasonably sized spool, a maximum thickness of ten mils for the aggregate added components, including adhesive, is recommended for use with extendible booms presently available.

Heating element 50 and conductors 52, 53 and 54 as well as insulating layers 57 and 58, as shown in FIGS. 4 and 5, are subject to certain stresses when the extendible tube 21 is furled and unfurled. A first stress tends to cause either longitudinal elongation or compression of the elements fixed to the ribbon when it is wound into a spool. A second stress tends to produce a transverse elongation of the elements attached to the ribbon when it assumes a circular shape, or, inversely, a transverse compression of the element when the circular ribbon is flattened. Neither the longitudinal nor the transverse stress is of sufficient magnitude to be of special concern in the selection of the material of heating element 50, conductors 52, 53, and 54, or insulating layers 57 and 58, as will be seen in the subsequent calculations.

Considering first the longitudinal stress, and assuming a ribbon wall thickness of 5 mils, a total thickness of 10 mils for the conductors and insulating layers and a minimum spool diameter of three inches, the maximum difference in longitudinal stress on the components affixed to the ribbon is proportional to the difference in radii of the inner and outer surfaces of the ribbon (including the components) which is equal to $$\frac{(1.500 + 0.005 + 0.010) - 1.500}{1.500} \times 100\% = 1.0\%.$$

Considering next the transverse stress, and assuming the same dimensions for the ribbon and component thicknesses, and further assuming a tubular diameter of two inches, the maximum difference in transverse stress on the components affixed to the ribbon is proportional to the difference in radii of the inner and outer surfaces of the ribbon (including the components) which is equal to $$\frac{(1.000 + 0.005 + 0.010) - 1.000}{1.000} \times 100\% = 1.5\%.$$

Because of the greater transverse stress, conductors 52, 53 and 54, and the strip of resistive wire of heating element 50 tend to be disposed in a longitudinal direction along boom 21, as will be seen in the discussion of FIGS. 6 and 7.

FIG. 6 shows a portion of extended boom 21 having three discrete heating elements 61, 62, and 63 controlled by a single temperature sensing device, such as thermistor 60. Heating element 61 is coupled at points 74 and 64 to conductors 69 and 70, respectively; heating element 62 is coupled at points 65 and 66 to conductors 70 and 71, respectively; and heating element 63 is coupled at points 67 and 68 to conductors 71 and 72, respectively.

Thermistor 60 is coupled between conductors 72 and 73. It is seen that in the configuration of FIG. 6 only three conductors 69, 72, and 73 are required regardless of the number of heating elements.

FIG. 7 shows a portion of extended boom 21 having two heating elements 81 and 83 individually controlled by separate temperature sensing devices, such as thermistors 80 and 82, respectively. Heating element 81 is coupled at points 84 and 85 to conductors 86 and 88, respectively, and heating element 83 is coupled at points 89 and 90 to conductors 91 and 88, respectively. Thermistor 80 is coupled between conductors 87 and 88, and thermistor 82 is coupled between conductors 92 and 88. It can be seen from FIG. 7 that for each additional heating element individually controlled by a separate thermistor, two additional conductors are required.

Figures 8A, 9A:
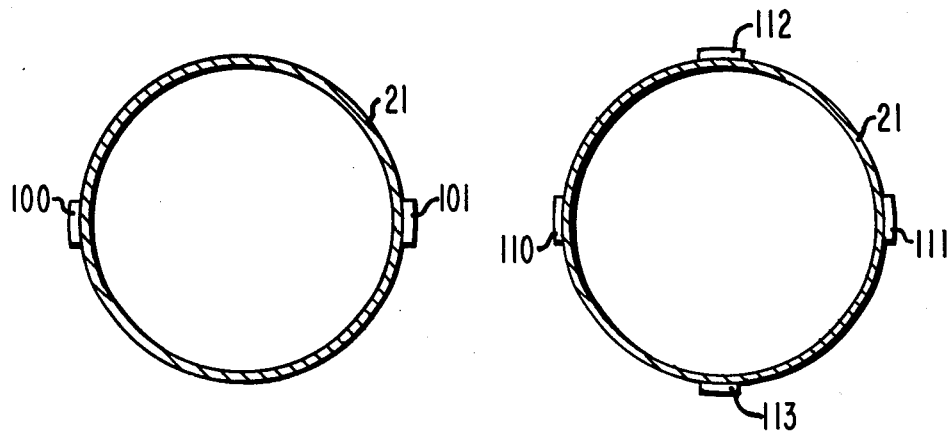
Figures 8B, 9B:
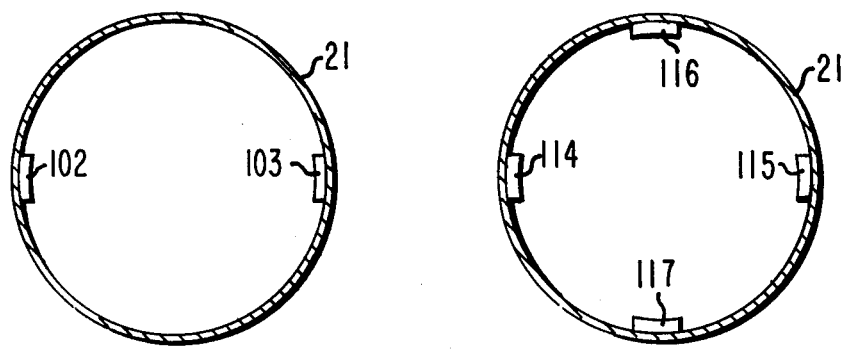

Tubular boom 21 is shown in cross-section in FIG. 8a depicting the location of heating elements 100 and 101 in diametric opposition on the outside surface of the wall of the extended tube. FIG. 8b shows the location of heating elements 102 and 103 in diametric opposition on the inside surface of tubular boom 21. An embodiment including two pairs of heating elements 110, 111, and 112, 113 in quadrature distribution on the outside surface of tubular boom 21 is shown in FIG. 9a, and a further embodiment including two pairs of heating elements 114, 115, and 116, 117 in quadrature distribution on the inside surface of tubular boom 21 is shown in FIG. 9b. For the sake of simplicity, the cross-section of tubular boom 21 as shown in FIGS. 8a, 8b, 9a, and 9b is a cylindrical tube, with the overlap of the longitudinal edges deleted.

FIG. 10 is a diagram of a controlled current source 40 in accordance with one embodiment of the circuit including heating elements, temperature sensing devices, and signal processing electronics. One heating element, shown as resistor 120, and its associated thermistor, shown as variable resistor 121, are located on one side of a tubular boom, and a second heating element, shown as resistor 130, and its associated thermistor, shown as variable resistor 131, are located on the other side of the boom. Thermistor 121 is coupled through switch assembly 140 to current source 40 via conductor 125a. Heating element 120 is coupled through switch assembly 140 to current source 40 via conductor 125b and normally closed switch contact 140a. The return from both thermistor 121 and heating element 120 is coupled through switch assembly 140 to ground in current source 40 via conductor 125c. Thermistor 131 is coupled through switch assembly 140 to current source 40 via conductor 135a. Heating element 130 is coupled through switch assembly 140 to current source 40 via conductor 135b and normally closed switch contact 140b. The return from both thermistor 131 and heating element 130 is coupled through switch assembly 140 to ground in current source 40 via conductor 135c. Conductors 125a, 125b and 125c comprise cable 41c (as shown in FIG. 3), and conductors 135a, 135b and 135c, comprise cable 41d.

FET 122 is biased by resistor 124 and the voltage applied at terminal 123 to maintain a constant current through thermistor 121 to ground via conductors 125a and 125c. Similarly, FET 132 is biased by resistor 134 and the voltage applied at terminal 123 to maintain a constant current through thermistor 131 to ground via conductors 135a and 135c. Because of the constant currents in conductors 125a and 135a, variations in the resistances of thermistors 121 and 131 will affect the voltages applied to the input terminals of comparators 126 and 136.

A thermistor is a semiconductor device which displays a change in resistivity in response to a change in temperature. It has a high negative temperature coefficient of resistance, so its resistance decreases as temperature rises. In the circuit of FIG. 10 an increase in temperature at thermistor 121 (with no corresponding increase at thermistor 131) will cause the resistance of thermistor 121 to decrease, resulting in a decreased voltage drop across thermistor 121 and at the (−) input terminal of comparator 136. As a result, the (+) input terminal of comparator 136 will be more positive than the (−) input terminal, and the comparator output will enable a signal on path 138 which will cause driver 137 to conduct current through heating element 130 via normally closed contact 140b of switch assembly 140 and conductors 135b and 135c. The current through heating element 130 will cause heat to be produced resulting in a decreased resistance in the collocated thermistor 131. As the resistance of thermistor 131 drops, so also does the voltage across it and at the (+) input terminal of comparator 136. When the voltage at the (+) input terminal of comparator 136 has equalled the voltage at its (−) input terminal, the signal at the output terminal 136 is disabled and the current flow through heating element 130 is discontinued.

In a similar manner, heat from an external source applied at thermistor 131 causing a temperature imbalance between the thermistors 131 and 121, will cause comparator 126 to generate a signal on path 128 enabling driver 127 to provide a current through heating element 120 via normally closed contact 140a of switch assembly 140 and conductors 125b and 125c until the collocated thermistor 121 achieves the same temperature as thermistor 131.

Whereas heating elements 120 and 130 and thermistors 121 and 131 are located on the extended tubular boom 21, the balance of the signal processing electronics, including constant-current drivers 122 and 132, comparators 126 and 136, and drivers 127 and 137 are located within the spacecraft. Switch assembly 140 provides normally closed contacts 140a and 140b through which the heating current flows. It is located within the tube dispensing unit and contacts 140a and 140b open when the boom is furled, preventing heating of the tube when it is in the spooled condition.

Figure 11A:
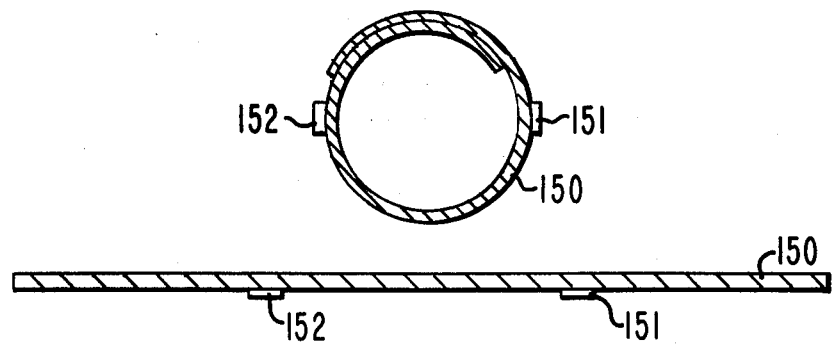
Figure 11B:
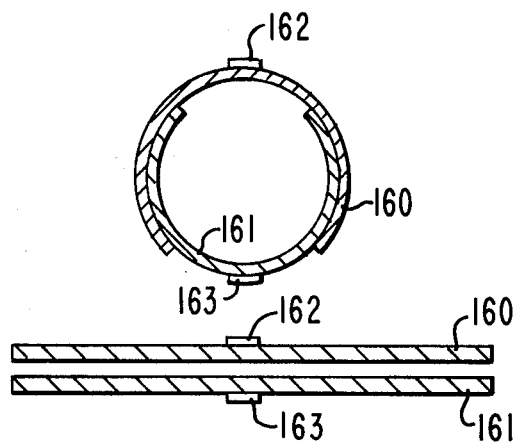
Figure 11C:
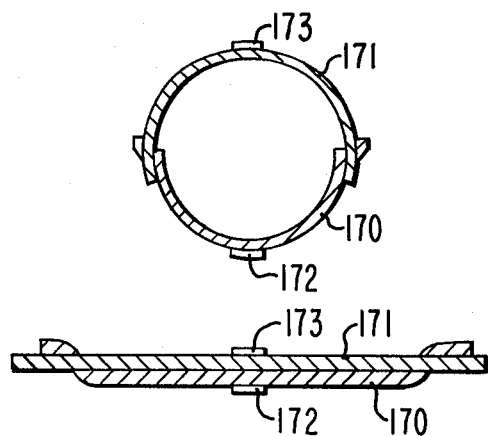

FIGS. 11a, 11b, and 11c depict locations of heating elements and temperature sensing devices on actual embodiments of tubular booms. In FIG. 11a a single-ribbon overlapping boom 150, having two component locations 151 and 152, is shown in cross-section, both in its tubular and its flattened conditions. In FIG. 11b a boom having two overlapping ribbons 160 and 161, and having two component locations 162 and 163, is shown in cross-section, both in its tubular and its flattened conditions. FIG. 11c is a cross-sectional view of the tab-in-slot-type boom, including the tab-edged ribbon 170 and the slot-edged ribbon 171 and two component locations 172 and 173, both in its tubular and its flattened conditions.

The concept of the present invention, that of applying heat to a selected sector of a satellite boom to effect a desired change in position of the extended portion of the boom, may also prove useful in instances where there is a requirement that the tip portion of booms extending from opposite sides of the spacecraft be maintained in collinearity. Vibrational disturbances during lift-off may cause the furled boom spools to shift slightly, resulting in a gross misalignment of the tip portions when the booms are extended. By selectively heating portions of the boom, a forced curvature compensation may be provided to improve the collinearity of the tip portions.

FIG. 12 illustrates in exaggerated scale the problem of a misaligned dispensing spool 151 causing a corresponding misalignment of boom 152, in contrast with the properly aligned dispenser 153 and boom 154. A first level of current applied to heating element 157, located at the approximate midpoint of boom 152, heats boom 152 causing the deflection of the boom tip to position 155', and second level of current, greater than the first, causes further deflection to position 155". Position 155' provides parallelism between tip portion 156 and the deflected tip position 155' but with an offset between position 155' and axis 161, which extends along boom 154 through the center of satellite 150. Position 155" provides collinearity of tip portion 155 and the further deflected tip at position 155" while sacrificing parallelism. Position 155" may be the preferred positioning where the line between tip portion 156 and the tip deflected to position 155" must be maintained in an orthogonal relation to booms 158, 159 and 160.

The system of FIG. 3 may be employed to provide forced curvature compensation, simply by modifying the controlled current source 40 to allow open loop control of the current drivers. Referring to FIG. 13, a system is shown in which a boom control circuit 160, responsive to the position of the tip portion 164 of a spar-type member, such as boom 21, selectively applies electrical signals to drivers 161a and 161b which supply current, via cables 163a and 163b, respectively, to heating elements 162a and 162b, respectively, to thereby force curvature of the boom 21.

Boom control circuit 160 may be, for example, an optical device monitoring the position of tip portion 164 in combination with a transmitter/receiver apparatus for 40 sending video information to a ground station where corrective data would be returned to satellite 20 which would energize the appropriate driver 161a or 161b. Alternatively, where tip portion 164 functions as a transmitting antenna, the deviation of tip portion 164 from a predetermined position might be determined by data reduction. Using this method, a series of commands to boom control circuit 160 would have the effect of altering the position of tip portion 164 until a maximum (or null) condition of transmission were obtained, indicating achievement of the optimal positioning of tip portion 164.

What is claimed is:

1. An apparatus for preventing distortion of a spar-type member extending outwardly from an orbiting spacecraft due to unequal heat application from an external source, said apparatus comprising:
   two electrically resistive strip heating elements attached to said member, said two elements positioned at opposite sides of the cross-section of said member;
   means for sensing the temperature of said member at points adjacent each of said elements; and
   means responsive to said temperature sensing means for providing an electric current to a selected one of said elements when a temperature difference between said points is sensed, to thereby equalize the temperature of said member at said points adjacent said elements.

2. The apparatus according to claim 1 wherein said spar-type member is a tubular boom.

3. The apparatus according to claim 2 wherein said strip heating elements are attached to the inside surface of said tubular boom.

4. The apparatus according to claim 2 wherein said strip heating elements are attached to the outside surface of said tubular boom.

5. The apparatus according to claim 2 wherein said boom is an elongated ribbon which is prestressed to assume a rigid tubular shape when extended, and which can be flattened and coiled about a spool.

6. The apparatus according to claim 5 including means for disabling said means for providing an electric current when said tubular boom is in a coiled position.

7. The apparatus according to claim 5 wherein said strip heating elements are of a flexible material and of a thickness relative to said ribbon and its amount of prestress to thereby permit said ribbon to coil without significant obstruction from said strip heating elements.

8. The apparatus according to claim 1 wherein said member is made of an electrically conductive material, and wherein said apparatus further comprises an insulating layer coated on said member to provide electrical isolation of said strip heating elements and said temperature sensing means from said member.

9. The apparatus according to claim 8 wherein said member is an elongated ribbon which is prestressed to assume a rigid tubular shape when extended and which can be flattened and coiled about a spool.

10. The apparatus according to claim 9 wherein said strip heating elements and said insulating layer are of a flexible material and of a thickness relative to said ribbon and its amount of prestress to thereby permit said ribbon to coil without significant obstruction from said strip heating elements and said insulating layer.

11. The apparatus according to claim 1 wherein said temperature sensing means includes thermistors located adjacent said heating elements for providing electrical signals indicative of the temperatures at the points adjacent said elements.

12. The apparatus according to claim 11 including means for disabling said means for providing an electric current when said electrical signals indicative of the temperatures adjacent said heating elements are substantially equal.

13. The apparatus according to claim 11 wherein said means for providing an electric current includes means for comparing said electrical signals indicative of the temperatures at said points adjacent said heating elements, and means for directing an electric current to said strip heating element adjacent the temperature sensing means indicating the lower temperature.

14. An apparatus for preventing distortion of a tubular boom extending outwardly from an orbiting spacecraft due to unequal heat application from an external source, said apparatus comprising:
   an even-numbered plurality of electrically resistive strip heating elements attached to said boom, said plurality of heating elements disposed around the circumference of said boom;
   means for sensing the temperature of said boom at points adjacent each of said heating elements; and
   means responsive to said temperature sensing means for providing electric currents to a selected one or more of said heating elements when temperature differences between diametrically-opposed points is sensed, to thereby equalize the temperature of said boom at said diametrically-opposed points adjacent said heating elements.

15. In a spacecraft having a tubular boom extending outwardly, an apparatus for altering the position of the outer tip of said boom to a predetermined position, said apparatus comprising:

two strip resistive heating elements attached to said boom, said elements positioned, respectively, at sectors on opposite sides of the cross-section of said boom;

means for determining the deviation of said outer tip from said predetermined position; and means responsive to said deviation determining means for providing an electric current to a selected one of said heating elements to thereby distort said boom by causing expansion of the sector of said boom adjacent said selected heating element relative to the sector of said boom adjacent the other heating element.

16. In a spacecraft having a tubular boom extending outwardly, an apparatus for altering the position of the outer tip of said boom to a predetermined position, said apparatus comprising:

a plurality of strip resistive heating elements attached to said boom, said elements disposed, respectively, at sectors around the circumference of said boom;

means for determining the deviation of said outer tip from said predetermined position; and means responsive to said deviation determining means for providing electric currents to a selected one or more of said heating elements to thereby distort said boom by causing expansion of the sectors of said boom adjacent said selected one or more of said heating elements relative to the sectors of said boom adjacent the unselected heating elements.

17. The apparatus according to claims 15 or 16, wherein said tubular boom is an elongated ribbon which is prestressed to assume a rigid tubular shape when extended, and which can be flattened and coiled about a spool.

18. The apparatus according to claim 17 wherein said strip heating elements are of a flexible material and of a thickness relative to said ribbon and its amount of prestress to thereby permit said ribbon to coil without significant obstruction from said strip heating elements.

* * * * *